United States Patent [19]

Rhoades et al.

[11] 4,315,600
[45] Feb. 16, 1982

[54] SPRAY GUN INJECTOR

[75] Inventors: Edward J. Rhoades, Troy; Edwin C. Rosenberger, Piqua; Jerome A. Waker, Casstown, all of Ohio

[73] Assignee: Chem-Lawn Corporation, Columbus, Ohio

[21] Appl. No.: 112,883

[22] Filed: Jan. 17, 1980

[51] Int. Cl.³ ............................................. B05B 7/28
[52] U.S. Cl. .................................. 239/74; 137/564.5; 137/893; 222/134; 239/310; 239/323
[58] Field of Search ............................... 222/133–135, 222/209, 386.5; 137/564.5, 893; 239/74, 310, 315, 316, 318, 322, 323, 327, 373

[56] References Cited

U.S. PATENT DOCUMENTS 2,199,151  4/1940  Dailey et al. ................ 137/564.5 X
3,207,443  9/1965  Gilmour ......................... 239/318 X
4,210,175  7/1980  Daniels et al. .................. 137/564.5

FOREIGN PATENT DOCUMENTS 936956  9/1963  United Kingdom ............. 137/564.5

Primary Examiner—Andres Kashnikow
Attorney, Agent, or Firm—Biebel, French & Nauman

[57] ABSTRACT

A trigger actuated fertilizer spray gun has a herbicide injector mounted on its muzzle with the valve for the injector having an actuator which is also accessible from the handle of the gun, so that an operator, while spraying fertilizer, can make spot applications of a herbicide as weeds are encountered in the area being fertilized. The herbicide is carried in a canister which can either be mounted on the handle of the spray gun or on a belt worn by the operator and the canister is divided into first and second, variable volume chambers by a flexible diaphragm. The first chamber is connected to the flow passage of the fertilizer to pressurize it to approximately the line pressure of the fertilizer flow, and the second chamber, containing the herbicide, is connected to the injector at a venturi-shaped portion of a passage through it. The second, herbicide filled chamber is therefore under pressure exerted by the diaphragm so that when the valve is opened the herbicide is sprayed into the flow of fertilizer passing through the injector. The venturi-shaped portion of the passage at the point where the herbicide is injected into the fertilizer flow also facilitates herbicide flow so that there is an almost instantaneous flow of herbicide into the fertilizer when the valve is actuated.

5 Claims, 10 Drawing Figures

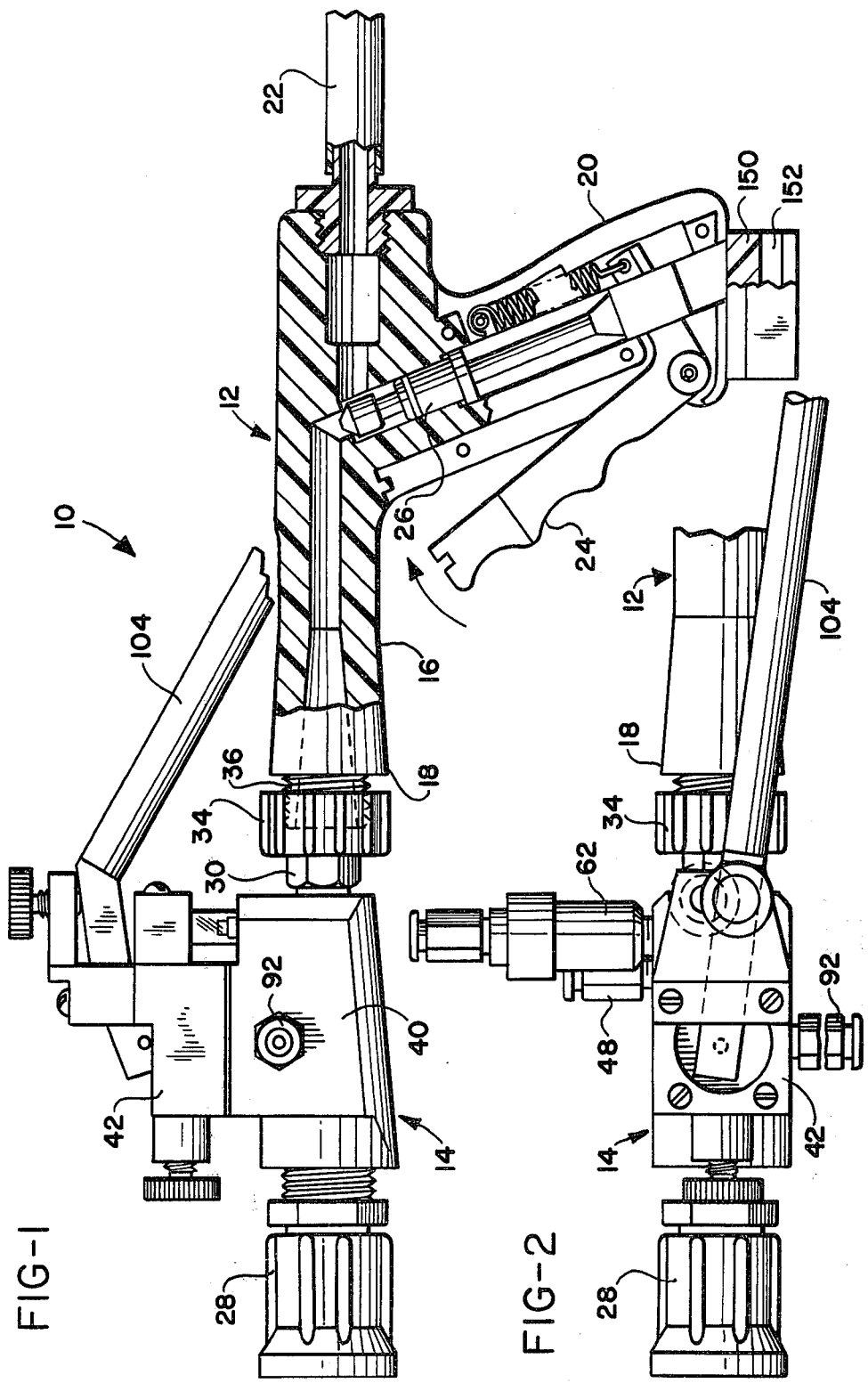

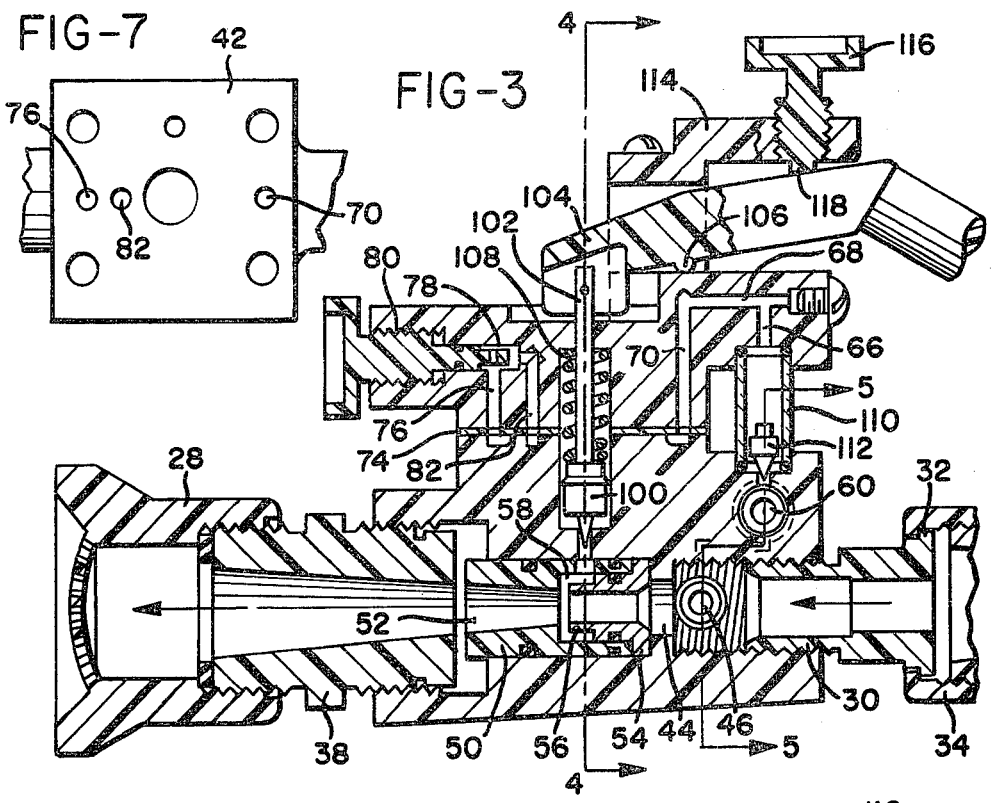
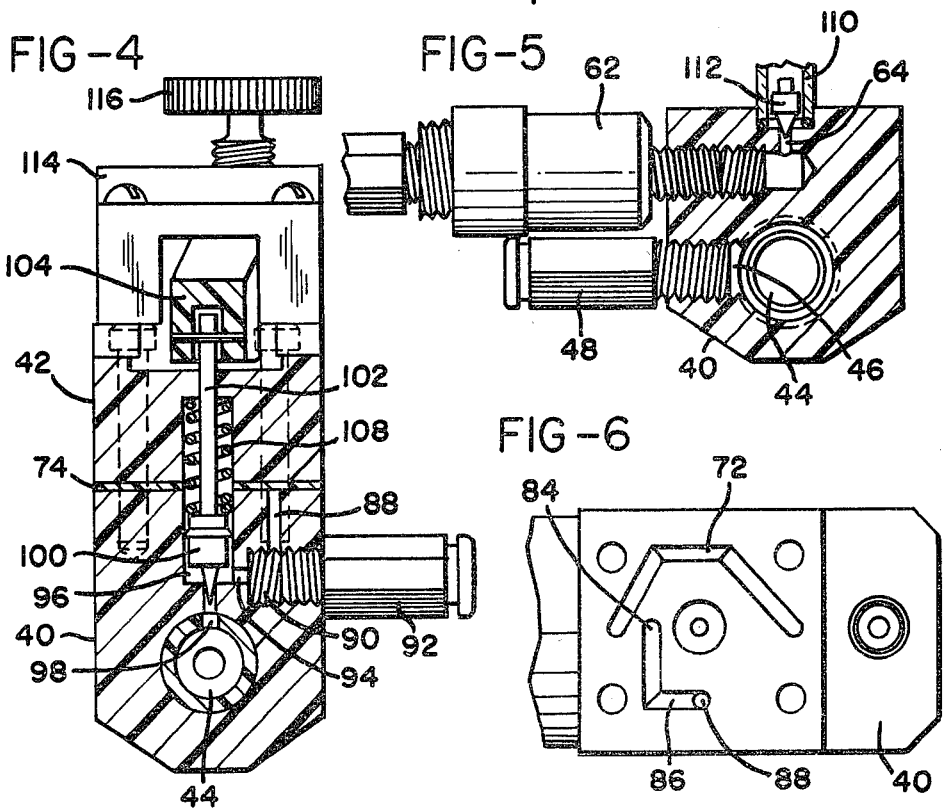

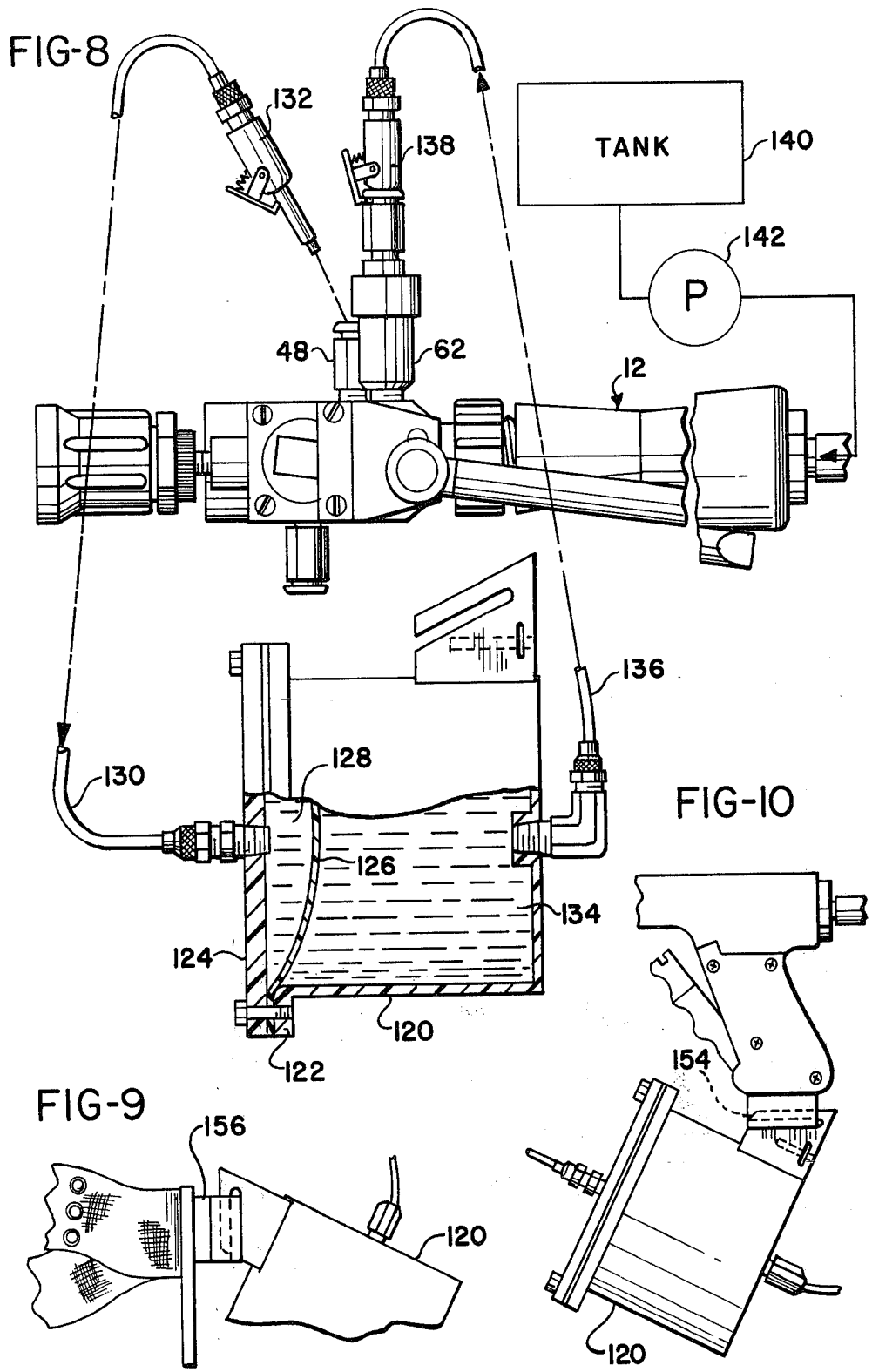

SPRAY GUN INJECTOR

BACKGROUND OF THE INVENTION

Although not so limited a typical application of the present invention is in commercial lawn service operations. Prior to the present invention an operator rendering a routine fertilizer treatment of a lawn would carry a separate spray gun for spot spraying patches of weeds and other undesirable vegetation. Obviously this is a cumbersome and time consuming operation.

While a herbicide could be mixed with the fertilizer this results in excessive use of herbicide in areas which did not require it. Additionally, an operator would not be sure that herbicide was actually being applied.

SUMMARY OF THE INVENTION

The present invention provides a spray gun mounted herbicide injector which permits spot application of herbicide during a normal fertilizer spraying operation.

Herbicide is carried in a variable volume chamber of a canister which may be either attached to the handle of the fertilizer gun or worn on the belt of the user. The herbicide is pressurized to approximately fertilizer line pressure by the use of a diaphragm in the canister which separates the canister into a herbicide chamber and a pressurizing chamber, with the latter pressurized by a connection with a flow passage through the injector.

With this construction an almost instantaneous burst of herbicide is provided when a valve controlling herbicide flow is actuated by an operator. This action is enhanced by introducing the herbicide into the passage through the injector at a venturi-shaped portion of the passage.

Because herbicide flow is responsive to fertilizer flow rate and line pressure, herbicide is metered into the flow passage in proportion to fertilizer flow.

Additionally, the herbicide flows through a sight gauge mounted in the injector so that the operator has visual evidence of herbicide flow.

Thus, the present invention provides significant advantages over prior art application with a separate herbicide applicator or blanket spraying of a mixture of herbicide and fertilizer.

BRIEF DESCRIPTION OF THE DRAWINGS

FIG. 1 is a side view, partly in section, of a combination spray gun—herbicide injector in accordance with the present invention;

FIG. 2 is a top view of a portion of the spray gun—herbicide injector;

FIG. 3 is a cross-sectional view thereof;

FIG. 4 is a view taken along line 4—4 of FIG. 3;

FIG. 5 is a view taken along line 5—5 of FIG. 3;

FIG. 6 is a top view of the lower portion of the main body section of the injector;

FIG. 7 is a bottom view of the upper portion of the main body section;

FIG. 8 is a partly schematic illustration of the spray-gun herbicide injector of the present invention;

FIG. 9 is a view showing a canister attached to the belt of an operator; and

FIG. 10 is a view showing a canister attached to the handle of the spray gun.

DESCRIPTION OF THE PREFERRED EMBODIMENTS

The spray-gun injector 10 of the present invention includes a spray gun 12 and an injector 14. The spray gun may be of the type shown in U.S. Pat. No. 4,083,497, issued Apr. 11, 1978. Except as the spray gun functions in combination with the injector however, the spray gun per se does not constitute the present invention.

For a complete description of the structure and operation of the spray gun reference may be had to the above noted patent. For present purposes it may be noted that the spray gun includes a barrel 16 terminating in a muzzle 18 and having a handle 20. A hose or other conduit 22 may be attached to the rear end of the spray gun and connected to a source of fertilizer or the like under pressure, so that when a trigger 24 is moved in the direction indicated by the arrow the valve 26 moves downwardly as seen in FIG. 1, allowing pressurized fertilizer to flow through the barrel of the gun and out the muzzle 18. Normally when the gun is used alone a nozzle, such as that shown at 28, is attached directly to the muzzle of the gun to provide a uniform spray of fertilizer.

In the present invention, however, the injector 4 is mounted on the muzzle 18 of the gun and, as can best be seen with reference to FIGS. 1 and 3, this is accomplished through the use of an externally threaded member 30 having an outwardly projecting flange 32 received in an internally threaded member 34, which is in turn threaded onto the externally threaded end 36 of the muzzle 18. The nozzle 28 may then be attached to the injector 14 by means of a double threaded adapter 38 which engages internal threads in the nozzle 28 and the injector 14.

The injector 14 includes a lower portion 40 and an upper portion 42. Lower portion 40 has a passage 44 formed through it, as can also be seen in FIGS. 4 and 5 of the drawings. An outlet 46 from the passage 44 is internally threaded to receive the external threads of a fitting 48, as best seen in FIG. 5 of the drawings. The left hand side of the passage 44 as seen in FIG. 3 of the drawings is enlarged to receive member 50, which has a venturi-shaped passage 52 formed through it. Received in the member 50 is an insert 54 of brass or the like wihch includes a nipple 56 projecting in a downstream direction to define an annular space 58. It will also be noted that members 50 and 54 are provided with O-rings to form a seal between each other and the walls of the passage 44.

As seen in FIGS. 3 and 5 of the drawings, an inlet 60 is internally threaded to receive a fitting 62 and a vertically extending port 64 projects upwardly from the inlet opening 60. The upper portion 42 of the main body section includes a vertically extending port 66 connected to a horizontally extending port 68, which in turn is connected to another vertically extending port 70.

The upper surface of the lower portion 40, as seen in FIG. 6, is provided with a channel 72, which cooperates with the gasket 74 shown in FIGS. 3 and 4 of the drawings and the lower surface of the upper portion 42 to define a roughly C-shaped port interconnecting the vertical port 70 and another vertical port 76 formed as seen in FIG. 3 of the drawings, in the upper portion 42.

Port 76 interconnects through a metering port 78 having an aperturned metering screw 80, with a vertically extending port 82. The lower end of port 82 connects with an end 84 of an L-shaped channel 86 formed in the upper surface of the lower portion 40, which cooperates with the gasket 74 and the lower surface of the upper portion 42 to define an L-shaped port, which in turn connects with a vertically extending port 88 formed, as seen in FIG. 4 of the drawings, in the lower portion 40. Port 88 in turn interconnects with a test outlet opening 90 which is internally threaded to receive a test fitting 92. A horizontal port 94 interconnects outlet 90 and a valve opening 96, which in turn communicates with a vertically extending port 98 which leads into the annular chamber 58 around the insert 56.

A valve 100 has its lower end seated in the port 98 and is interconnected by means of a valve stem 102 to one end of a valve actuator 104 which is provided with a fulcrum 106 which bears on an upper surface of the upper portion 42. A coil spring 108 surrounds the valve stem 102 and biases the valve 100 into the closed position shown in FIGS. 3 and 4 of the drawings. A clear plastic or glass sight gauge 110 is received in opposed openings formed in the upper and lower portions 42 and 40 and a weight 112 is slidably received within the sight gauge.

A bracket 114 carrying an externally threaded member 116 is mounted on the upper surface of the upper portion 42. A lower end 118 of member 116 bears against a portion of the actuator 104 to the right of the fulcrum point 106 as shown in FIG. 3 of the drawings.

As seen in FIG. 8, a liquid-tight canister 120 is provided having an outwardly turned flange 122 and a cover 124 with a diaphragm 126 interposed between the flange and the cover. The flexible diaphragm 126 divides the canister into a first chamber 128 of variable volume which is interconnected through a conduit 130, and fittings 132 and 48, which are also as shown in FIGS. 2 and 5 of the drawings, to the fertilizer line pressure. Diaphragm 126 also defines a second variable volume chamber 134 which is interconnected by means of the conduit 136, and fittings 138 and 62 to the inlet 60.

With the above structure it will be seen that liquid fertilizer may be pumped to the gun 12 from a tank 140 by means of a pump 142, pressurizing the system with liquid fertilizer up to the valve 26. When the trigger 24 is actuated and the valve 26 opened, liquid fertilizer flows under pressure through the gun and out the muzzle 18 into the passage 44 in the injector 14. Thus, the trigger 24 also controls the flow through the injector 14. This also pressurizes the line 130 and the variable volume chamber 128, placing the liquid herbicide contained in the variable volume chamber 134 also under pressure.

Thus, when the actuator 104 is depressed downwardly, usually by the thumb of the hand of the operator grasping the handle 20, the valve 100 unseats, allowing herbicide to flow into the inlet 60, up through the sight gauge 110, raising the float 112, and thence into the vertical port 66 in the upper portion 42. From port 66 the herbicide flows through horizontal port 68 and then down into vertical port 70 and around through the port formed by the C-shaped channel 72 and up the vertical port 76 and through the metering port 78 and thence downwardly through the port 82 into the port formed by the L-shaped channel 86. The herbicide then flows through the vertical channel 88 formed in the lower portion 40 and into the port 94 and out the port 98 into the annular space 58. Because of the venturi configuration of the passage 44 at this point herbicide is immediately sucked into the stream of the fertilizer, providing an almost instantaneous response to actuation of the herbicide control.

It should be noted that both the quantity and pressure of fertilizer flow can be varied in proportion to the distance the trigger 24 is depressed. As a result both the pressure exerted on the canister and the amount of suction exerted at the venturi-shaped portion of the passage 54 will vary in response to the amount of fertilizer flow through the spray gun. This in turn causes the herbicide to be metered in proportion to fertilizer flow.

It should be noted that fitting 92 contains a one-way check valve, not shown, which normally maintains fitting 92 closed. However, if it is desired to check the flow rate of the herbicide a bayonet-type fitting, such as that shown at 132 in FIG. 8 of the drawings, can be inserted into the fitting 92, displacing the one-way check valve and allowing herbicide to flow into a beaker or the like for test purposes. In this regard it will also be noted that fittings 48 and 62 also contain one-way check valves so that when the fittings 132 and 138 are removed, fittings 48 and 62, respectively, are sealed against outward flow.

The bottom of the handle of the gun 12, as best seen in FIGS. 1 and 10 of the drawings, is provided with a bracket 150 having a T-shaped slot 152 formed therethrough which receives an upper slotted portion 154 of a complementary bracket attached to the canister 120. Therefore, if convenient the operator can simply attach the canister to the lower end of the handle 20 of the gun 12. Alternatively, the operator may utilize a belt mounted bracket 156 as shown in FIG. 9 of the drawings, to which the canister 120 can be attached in a similar manner.

From the above it will be seen that the present invention provides a spray gun injector which permits almost instantaneous spot application of herbicide during normal fertilizer spraying operations.

While the forms of apparatus herein described constitute preferred embodiments of the invention, it is to be understood that the invention is not limited to these precise forms of apparatus, and that changes may be made therein without departing from the scope of the invention.

What is claimed is:

1. In combination with a spray gun including a muzzle and means for controlling the flow of a liquid through said muzzle, an injector comprising:
a main body section having a passage formed therethrough,
means mounting said main body section on said gun with said passage communicating with said muzzle whereby said liquid flow through said passage is controlled by said spray gun flow control means,
a liquid-tight container,
a flexible diaphragm separating said container into first and second chambers,
first means placing said first chamber and said passage in communication with each other at a first point along said passage whereby liquid pressure in said passage is transmitted directly to said first chamber an indirectly through said diaphragm to said second chamber,
second means placing said second chamber in communication with said passage at a second point therealong spaced from said first point, valve means controlling flow from said second chamber into said passage, said main body section includes an upper portion and a lower portion, said second means placing said second chamber in communication with said passage includes an inlet into said main body section, an opening in said main body section at said second point along said passage, and a series of interconnecting ports in said upper and lower portions interconnecting said inlet and said opening at said second point along said passage.

2. The combination of claim 1 further comprising:
a sight gauge interposed between said inlet and said series of ports.

3. The combination of claim 1 further comprising:
metering means for metering the flow through said interconnected ports.

4. In combination with a spray gun including a muzzle, a handle, and a trigger accessible from said handle for controlling flow of a first liquid through said muzzle, an injector comprising:

a main body section having upper and lower portions, means defining a passage through said lower portion of said main body section, means for connecting said lower portion of said main body section to said muzzle whereby said flow through said passage is controlled by said trigger, means defining a venturi-shaped portion in said passage downstream of said muzzle, means defining an outlet from said passage intermediate said muzzle and said venturi-shaped portion of said passage, means defining an inlet into said lower portion of said main body section, a series of interconnecting ports formed in said upper and lower portions intermediate said opening and said inlet, a sight gauge interposed intermediate and in communication with said inlet and said interconnected ports, a valve mounted in said lower portion of said main body section and controlling flow through said opening into said venturi-shaped portion of said passage, valve actuating means mounted on said upper portion of said main body section and connected to said valve for actuating said valve, metering means in said upper portion of said main body section for metering flow through said interconnected ports, a light-tight cannister, a diaphragm mounted in said liquid-tight canister and separating it into first and second variable volume chambers, a first conduit interconnecting said outlet and said first chamber, a second conduit interconnecting said inlet and said second chamber, means defining a test outlet along said passage at said venturi-shaped portion thereof, and means for detachably attaching said canister to said handle.

5. In combination with a spray gun including a handle and a muzzle and means for controlling the flow of a liquid through said muzzle, an injector comprising:

a main body section having a passage formed therethrough, means mounting said main body section on said gun with said passage communicating with said muzzle whereby said liquid flow through said passage is controlled by said spray gun flow control means, a liquid-tight container, a flexible diaphragm separating said container into first and second chambers, first means placing said first chamber and said passage in communication with each other at a first point along said passage whereby liquid pressure in said passage is transmitted directly to said first chamber and indirectly through said diaphragm to said second chamber, second means placing said second chamber in communication with said passage at a second point therealong spaced from said first point, valve means controlling flow from said second chamber into said passage, valve actuating means for selectively actuating said valve means, said flow control means and said valve actuating means being located adjacent each other and said handle whereby said flow control means and said valve actuating means are actuatable simultaneously by a hand gripping said handle.

* * * * *